US009966638B2

United States Patent
Ueno et al.

(10) Patent No.: US 9,966,638 B2
(45) Date of Patent: May 8, 2018

(54) MANUFACTURING METHOD FOR NON-AQUEOUS SECONDARY BATTERY

(71) Applicant: TOYOTA JIDOSHA KABUSHIKI KAISHA, Toyota-shi, Aichi-ken (JP)

(72) Inventors: Yukiyoshi Ueno, Toyota (JP); Junko Ohira, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 226 days.

(21) Appl. No.: 15/034,739

(22) PCT Filed: Nov. 5, 2014

(86) PCT No.: PCT/IB2014/002332
§ 371 (c)(1),
(2) Date: May 5, 2016

(87) PCT Pub. No.: WO2015/068013
PCT Pub. Date: May 14, 2015

(65) Prior Publication Data
US 2016/0268648 A1    Sep. 15, 2016

(30) Foreign Application Priority Data

Nov. 11, 2013 (JP) ................................. 2013-233375

(51) Int. Cl.
*G01R 31/28* (2006.01)
*H01M 10/44* (2006.01)
(Continued)

(52) U.S. Cl.
CPC ......... *H01M 10/446* (2013.01); *H01M 2/024* (2013.01); *H01M 2/0439* (2013.01);
(Continued)

(58) Field of Classification Search
CPC . H01M 10/058; H01M 10/44; Y02T 10/7011; B60L 11/1861; Y02E 60/122;
(Continued)

(56) References Cited

U.S. PATENT DOCUMENTS 5,744,963 A * 4/1998 Arai .................... B60L 11/1851
                                                          320/146
9,768,446 B2 * 9/2017 Nagai ................. H01M 4/5825

FOREIGN PATENT DOCUMENTS

| JP | 2800220 B2 | 9/1998 |
| JP | 2012-084346 A | 4/2012 |
| JP | 2015-095332 A | 5/2015 |

* cited by examiner

Primary Examiner — Thiem Phan
(74) Attorney, Agent, or Firm — Sughrue Mion, PLLC

(57) ABSTRACT

A manufacturing method for a non-aqueous secondary battery includes the following steps. (a) Preparing an electrode body including a positive electrode having a positive electrode active material layer and a negative electrode having a negative electrode active material layer. (b) Constructing a battery assembly using the electrode body and a non-aqueous electrolyte. (c) Initially charging the battery assembly. (d) Aging the battery assembly at a temperature of 60° C. or higher. (e) Forcibly starting to discharge the battery assembly in said temperature region after lowering the temperature of the battery assembly down to a temperature region of 35° C. or higher and 55° C. or lower. (f) Adjusting the SOC of the battery assembly. (g) Measuring a voltage drop amount by self-discharging the battery assembly. And (h) determining whether or not the battery assembly is qualified based on the voltage drop amount.

9 Claims, 9 Drawing Sheets

(51) Int. Cl.

| | |
|---|---|
| *H01M 4/131* | (2010.01) |
| *H01M 4/133* | (2010.01) |
| *H01M 4/505* | (2010.01) |
| *H01M 4/525* | (2010.01) |
| *H01M 10/04* | (2006.01) |
| *H01M 10/0525* | (2010.01) |
| *H01M 10/058* | (2010.01) |
| *H01M 10/0587* | (2010.01) |
| *H01M 2/02* | (2006.01) |
| *H01M 2/04* | (2006.01) |
| *H01M 2/16* | (2006.01) |
| *H01M 2/26* | (2006.01) |
| *H01M 2/30* | (2006.01) |
| *H01M 4/04* | (2006.01) |
| *H01M 4/1391* | (2010.01) |
| *H01M 4/1393* | (2010.01) |
| *H01M 4/587* | (2010.01) |
| *H01M 4/62* | (2006.01) |
| *H01M 4/66* | (2006.01) |
| *H01M 10/0568* | (2010.01) |
| *H01M 10/0569* | (2010.01) |
| *H01M 10/48* | (2006.01) |
| *H01M 4/02* | (2006.01) |

(52) U.S. Cl.
CPC ....... H01M 2/1653 (2013.01); H01M 2/1686 (2013.01); H01M 2/263 (2013.01); H01M 2/305 (2013.01); H01M 4/043 (2013.01); H01M 4/0404 (2013.01); H01M 4/131 (2013.01); H01M 4/133 (2013.01); H01M 4/1391 (2013.01); H01M 4/1393 (2013.01); H01M 4/505 (2013.01); H01M 4/525 (2013.01); H01M 4/587 (2013.01); H01M 4/622 (2013.01); H01M 4/623 (2013.01); H01M 4/625 (2013.01); H01M 4/661 (2013.01); H01M 10/049 (2013.01); H01M 10/058 (2013.01); H01M 10/0525 (2013.01); H01M 10/0568 (2013.01); H01M 10/0569 (2013.01); H01M 10/0587 (2013.01); H01M 10/48 (2013.01); *H01M 2004/021* (2013.01); *H01M 2004/027* (2013.01); *H01M 2004/028* (2013.01); *H01M 2300/004* (2013.01); *Y02T 10/7011* (2013.01); *Y10T 29/49004* (2015.01); *Y10T 29/49108* (2015.01)

(58) Field of Classification Search
CPC ......... Y10T 29/49108; Y10T 29/49004; Y10S 903/903
USPC .......................... 29/593, 623.1, 623.3, 623.4
See application file for complete search history.

FIG. 10

| | | \multicolumn{4}{c}{INITIAL TEMPERATURE OF S50 (°C)} | | | |
|---|---|---|---|---|---|
| | | 20 | 30 | 40 | 50 |
| REST TIME (Hr) | 0 | | | | |
| | 1 | | | 125 | 153 (AFTER 1.5 Hr) |
| | | | | 13.59 | 12.08 |
| | 2 | | | 181 | 180 |
| | | | | 12.04 | 11.57 |
| | 3 | | 159 | 239 | |
| | | | 14.18 | 11.60 | |
| | 4 | | 219 | | 274 |
| | | | 12.76 | | 11.37 |
| | 5 | 385 | | 356 | 394 |
| | | 13.15 | | 11.21 | 10.43 |
| | 10 | 699 | 580 | 660 | |
| | | 12.9 | 12.06 | 10.01 | |
| | 15 | | 883 | | |
| | | | 11.43 | | |
| | 24 | 1537 | | | |
| | | 11.73 | | | |
| | 48 | 2984 | | | |
| | | 10.58 | | | |

UPPER SECTION: REQUIRED TIME FROM THE END OF HIGH TEMPERATURE AGING AND COOLING TILL THE BEGINNING OF SELF-DISCHARGE INSPECTION (min)
LOWER SECTION: RESIDUAL CAPACITY RATIO (%)

F I G . 11
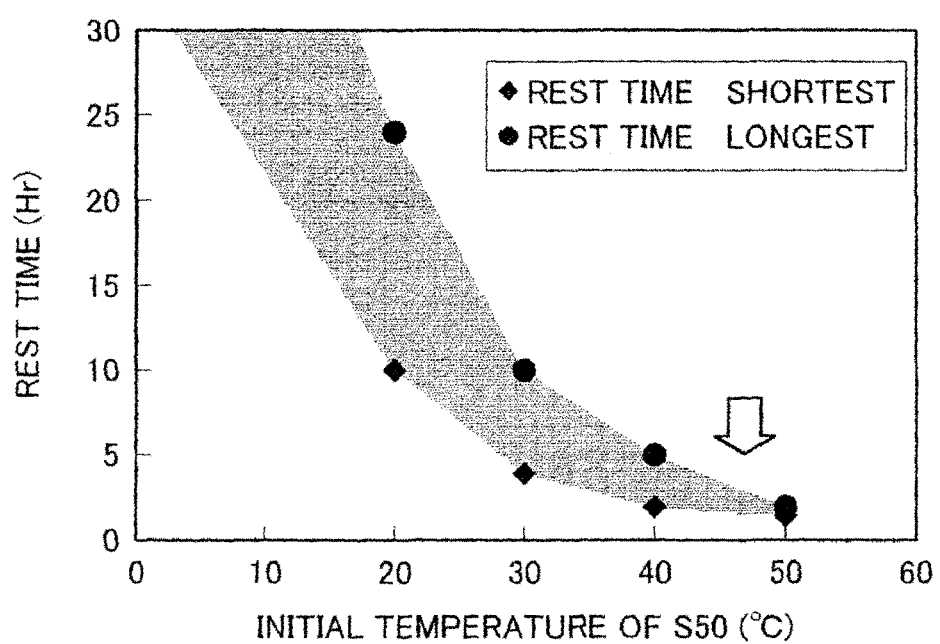

MANUFACTURING METHOD FOR NON-AQUEOUS SECONDARY BATTERY

BACKGROUND OF THE INVENTION

1. Field of the Invention

The present invention relates to a manufacturing method for a battery having a non-aqueous electrolyte (non-aqueous secondary battery).

2. Description of Related Art

A non-aqueous secondary battery such as a lithium ion battery and the like has light weight and high energy density as compared with existing batteries, and therefore is preferably used as a high output power source for mounting on vehicles in recent years. In manufacturing such battery, in general, firstly an electrode body is formed using a positive electrode and a negative electrode, and a battery assembly is constructed using the electrode body and a non-aqueous, electrolyte. Further, after prescribed initial charge (conditioning) and aging in a high-temperature environment are carried out on the constructed battery assembly, a performance qualification (e.g., self-discharge inspection) is performed.

In the self-discharge inspection, the battery assembly whose state of charge (SOC) has been adjusted is left to stand for a certain period of time. It is determined whether a minute internal short circuit occurs in the battery assembly by measuring the voltage drop amount during the stand (self-discharge) of the battery assembly. However, for an aged battery assembly, sometimes even after the SOC is adjusted, the voltage may be unstable temporarily, and the voltage may continuously rise or fall (hereinafter, such period is sometimes simply referred to as "voltage unstable period"). Therefore, in order to making an accurate inspection (determination), it is necessary to wait until the voltage of the battery assembly becomes sufficiently stable. Therefore, in the above manufacturing method, generally the time spent on manufacturing (typically, in the early stage in the self-discharge inspection, i.e., during the voltage unstable period) is apt to get longer. As a technique for dealing with this problem, there may be mentioned, for example, Japanese Patent Application Publication No. 2012-084346 (JP 2012-084346 A). In JP 2012-084346 A, a battery after aging is kept in a high SOC state for 1 to 7 days and then is forcibly discharged so that the amount of voltage difference before and after the forcible discharge is within a prescribed range. It is also described that by doing so, the self-discharge inspection period (during which the voltage is unstable) can be shortened.

SUMMARY OF THE INVENTION

However, according to the study by the present inventor, in the method described in JP 2012-084346 A, depending on the batch of the electrodes, the aging condition, etc., the voltage variation of the battery as above mentioned will sometimes last for a long time (e.g., five days or more). This tendency is especially remarkable in a battery which requires high output in a low SOC region (e.g., a region in which the SOC is 30% or lower). For example, this tendency is remarkable in the plug-in hybrid vehicle (PHV). Therefore, from the point of view of productivity, work efficiency and cost, there is a need to further shorten the self-discharge inspection period (e.g., voltage unstable period), without decreasing the inspection accuracy. The present invention is made in view of this situation, and an object of the present invention is to provide a method by which the period for manufacturing (typically, the voltage unstable period) can be shortened and an improved accuracy of self-discharge inspection can be maintained, so as to manufacture a battery with high reliability within a shorter period.

The present inventor has studied on the reasons why the voltage rises (or falls) in the self-discharge inspection, and has determined that this is related with the configuration of the electrode body. That is, in a typical configuration of a non-aqueous secondary battery, from the point of view of suppressing precipitation of the charge carriers (metal precipitation) in the negative electrode, the surface area of the negative electrode active material layer (the area formed with the active material layer) is larger than the surface area of the positive electrode active material layer. In other words, the negative electrode active material layer includes a portion facing the positive electrode active material layer (hereinafter, also simply referred to as "facing portion") and a portion not facing the positive electrode active material layer (hereinafter, also simply referred to as "non-facing portion"). In the thus-configured negative electrode active-material layer, if the charge carriers (typically, lithium ions) are occluded by the facing portion through initial charging (adjusting) and the potential of the facing portion is decreased, concentration alleviation of the charge carriers will occur in the negative electrode active material layer during the subsequent aging process. Moreover, the charge carriers will slowly move to the non-facing portion with a relatively high potential. If the battery is left to stand as it is in a high potential state (high SOC state), the above mentioned concentration alleviation will further proceed, and the charge carriers will move to the part closer to the end of the non-facing portion and/or to the deeper part of the non-facing portion. After that, if the battery is discharged, the charge carriers in the facing portion are released and the potential of the facing portion is increased. On the other hand, the charge carriers occluded by the non-facing portion are not released and remains in the non-facing portion. Therefore, the potential of the non-facing portion becomes relatively low as compared with the facing portion. If the potential unevenness (polarized state) occurs in the negative electrode active material layer, the charge carriers residual in the non-facing portion are diffused toward the facing portion. Therefore, the voltage rise of the battery will proceed until the above-mentioned potential difference is eliminated. In addition, to be contrary, in the case that the potential of the facing portion becomes relatively high as compared with the non-facing portion, the charge carriers will be diffused toward the non-facing portion from the facing portion, and therefore, the voltage fall of the battery will proceed until the above mentioned potential difference is eliminated.

Accordingly, in order to shorten the voltage unstable period, the present inventor focused on alleviating (or preventing) the potential unevenness in the negative electrode active material layer, and made the present invention after intensive study. That is, according to an aspect of present invention, a manufacturing method for a non-aqueous secondary battery includes the following steps. (a) Preparing an electrode body including a positive electrode having a positive electrode active material layer and a negative electrode having a negative electrode active material layer. The surface area of the negative electrode active material layer is larger than the surface area of the positive electrode active material layer. The negative electrode active material layer has a portion that faces the positive electrode active material layer and a portion that does not face the positive electrode active material layer. (b) Constructing a battery assembly using the electrode body and a non-aqueous electrolyte. (c)

Initially charging the battery assembly. (d) Aging the battery assembly at a temperature of 60° C. or higher. (e) After lowering the temperature of the battery assembly down to a temperature region of 35° C. or higher and 55° C. or lower, forcibly starting to discharge the battery assembly in the temperature region. (f) Adjusting the SOC of the battery assembly. (g) Measuring a voltage drop amount by self-discharging the battery assembly. And (h) determining whether or not the battery assembly is qualified based on the voltage drop amount.

The aspect is characterized in that the battery assembly is aged at a temperature of 60° C. or higher and that the battery assembly is forcibly discharged after the temperature of the aged battery assembly is lowered down to 35~55° C. By starting to forcibly discharge the battery assembly in the state that the temperature of the battery assembly is relatively high as described above, the diffusibility of the charge carriers can be improved and the polarized state in the negative electrode active material layer can be desirably alleviated. In this way, the voltage unstable period during the self-discharge inspection can be shortened. Furthermore, by keeping in the high temperature region for a relatively long period, a more uniform film can be formed on the surface of the negative electrode, and deviation occurred in self-discharge inspection can be reduced. Thereby, the defective product (the battery assembly in which internal short circuit occurs) can be clearly distinguished, and qualified products can be determined with high accuracy Therefore, according to above aspect, compared with the prior art, a battery with high reliability can be made within short time. Furthermore, in this Specification, a so-called "temperature of the battery assembly" refers to the value measured by a thermocouple adhered to the outer surface (bottom) of the battery case.

In the aspect described above, when the battery assembly is forcibly discharged, the temperature of the battery assembly may be lowered down while the battery assembly is forcibly discharged. Thereby the standby time required for stabilizing the temperature of the battery assembly till adjusting the SOC can be greatly reduced (or eliminated), and the production efficiency can be extraordinarily improved. Furthermore, in the case of natural cooling down, for example, when the battery assembly is forcibly discharged, it is unnecessary to keep the temperature of the battery assembly high, and therefore the cost for keeping the temperature can be reduced.

In the aspect described above, when the battery assembly is forcibly discharged, the battery assembly may be discharged to 1.6 V or more and 2.3 V or less. By making the arrival voltage (typically, termination voltage) within the above range, the potential difference between the facing portion and the non-facing portion can be enlarged. Therefore, the charge carriers residual in the non-facing portion can be escaped from the non-facing portion easily. Thereby, the potential unevenness in the negative electrode active material layer can be further desirably alleviated. As a result, the time for manufacturing (typically the self-discharge inspection time, e.g., the voltage unstable period) can be further shortened. Therefore, the effect of the present invention can be achieved at a higher level.

In the aspect described above, while the battery assembly is forcibly discharged, the battery assembly may be maintained in a temperature region of 20° C. or higher and 55° C. or lower. By forcibly discharging of the battery assembly while keeping the battery assembly at a temperature higher than the room temperature, the diffusibility of the charge carriers can be further improved, and the polarized state in the negative electrode active material layer can be further desirably alleviated. Therefore, the effect of the present invention can be achieved at a higher level.

In the aspect described above, a period from an end of the forcibly discharging of the battery assembly until a beginning of the adjusting of the SOC of the battery assembly may be set as 1 hour or more. In other words, a rest time of 1 hour or more can be provided between the step of forcibly discharging the battery assembly and the step of adjusting the SOC of the battery assembly. The battery after the forcible discharge is in a low voltage state (for example, 1.6 V to 2.3 V). By temporarily maintaining (standing) in such a state as it is, the state that the large potential difference between the facing portion and the non-facing portion can be maintained as it is. As a result, such a large potential difference can be used as a driving force so that the charge carriers in the non-facing portion can be diffused to the facing portion smoothly, and the polarized state in the negative electrode active material layer can be desirably alleviated.

In the aspect described above, when the SOC of the battery assembly is adjusted, the SOC may be adjusted so that a residual capacity ratio of the battery assembly represented by the following equation (I) becomes 11.5% or higher and 14% or lower.

$$\text{residual capacity ratio (\%)} = \frac{(\Sigma \text{ charge capacity} - \Sigma \text{ discharge capacity})}{\Sigma \text{ charge capacity}} \times 100 \quad (I)$$

Thereby the potential unevenness (polarized state) in the negative electrode active material layer occurred after the SOC adjustment as mentioned above can be prevented. Therefore, compared with the prior art, the voltage unstable period can be shortened, and the self-discharge inspection can be completed in a shorter period. According to the study of the present inventor, the voltage unstable period can be shortened to 2 days or less. For example, it is also possible to suppress the voltage unstable period to 0 day (substantially eliminated).

In the aspect described above, a period from an end of the aging of the battery assembly till forcibly staring to discharge the battery assembly may be set as 24 hours or less. By setting the period from the end of the step of aging the battery assembly till starting to forcibly discharge the battery assembly within the above period, the movement of the charge carriers to the end part and the deep part of the non-facing portion can be suppressed. Therefore, the charge carriers can be easily escaped from the non-facing portion, and the potential unevenness in the negative electrode active material layer can be further reduced. As a result, the voltage unstable period after the SOC adjustment can be further shortened.

In the aspect described above, when the adjusting of the SOC of the battery assembly may be finished, the SOC of the battery assembly is adjusted to 10% or lower. By evaluating the self-discharge characteristic in the above SOC range, the battery performance in the low SOC region (e.g., a region in which the SOC is 30% or lower) can be exactly evaluated. This is especially useful in, for example, a battery mounted in a plug-in hybrid vehicle (PHV), etc., which requires high output density over a broad SOC region.

In the aspect described above, when the battery assembly is initially charged, the battery assembly may be charged to a state in which the SOC is 65% or higher and 110% or lower, and the battery assembly may be subjected to aging for at least 5 hours. By charging the battery assembly to the above SOC range, a part of the non-aqueous electrolyte (e.g., non-aqueous solvent, film forming agent) can be suitably reduced and decomposed on the negative electrode. Thereby a film (SEI film; solid electrolyte interface film) composed of decomposition product of the non-aqueous electrolyte can be suitably formed on the surface of the negative electrode active material, and the durability of the battery can be improved. Moreover, by keeping the battery assembly in a high temperature region of 60° C. or higher for at least 5 hours, the SEI film formed on the surface of the negative electrode active material can be modified as a better and/or more homogeneous SEI film, and the resistance of the negative electrode can be effectively reduced. As a result, the deviation occurred in self-discharge inspection can be reduced, and qualified products can be, determined with a further improved accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 is a table showing the relationship among the rest time and the initial temperature of the forcibly discharging step, the time required from the end of the forcibly discharging to the beginning of the self-discharge inspection, and the residual capacity ratio, according to an embodiment;

FIG. 11 is a graph showing the relationship between the temperature of the battery assembly at the beginning of the forcibly discharging step and the rest time after the forcible discharge;

DETAILED DESCRIPTION OF EMBODIMENTS

Hereinafter, preferable embodiments of the present invention will be described with reference to the accompanying drawings appropriately. Furthermore, matters required for the execution of the invention, but not included in the matters particularly described in this Specification, can be understood as design matters for the skilled person in the art based on the prior art in this field. The invention can be implemented based on the contents of this Specification and the common technical knowledge in this technical field.

Figure 1:
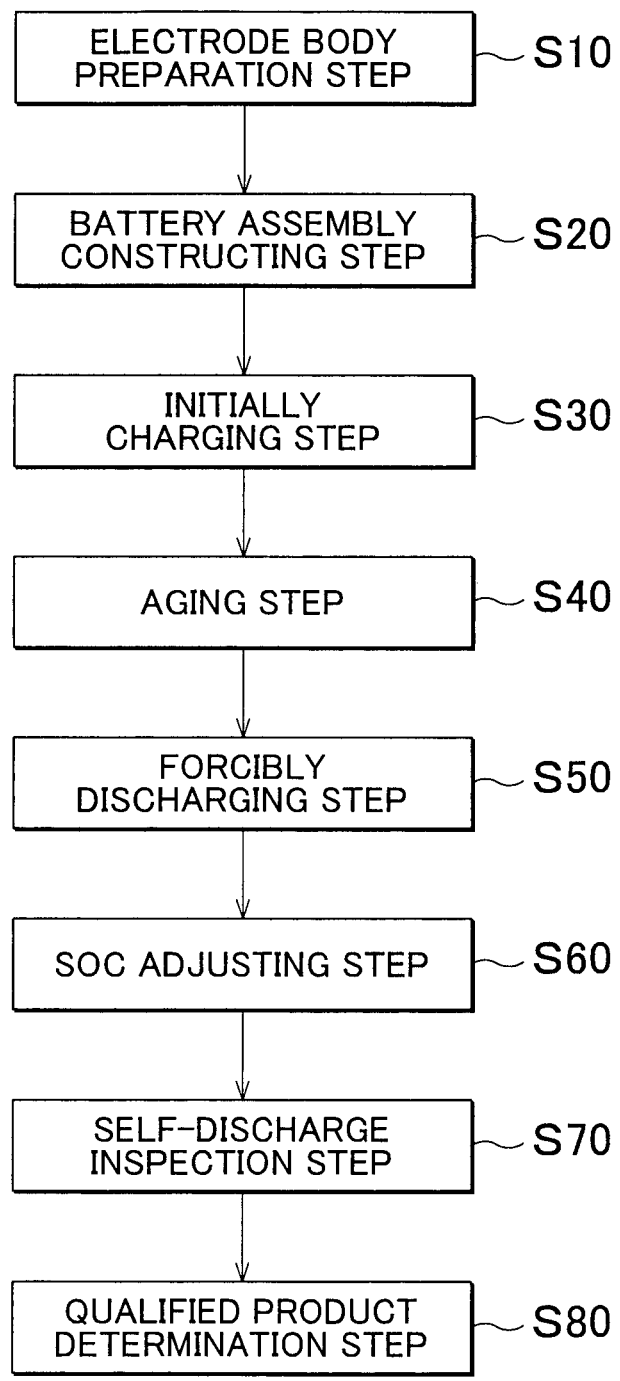
FIG. 1 is a flow chart showing a manufacturing method according to an embodiment.
Figure 2:
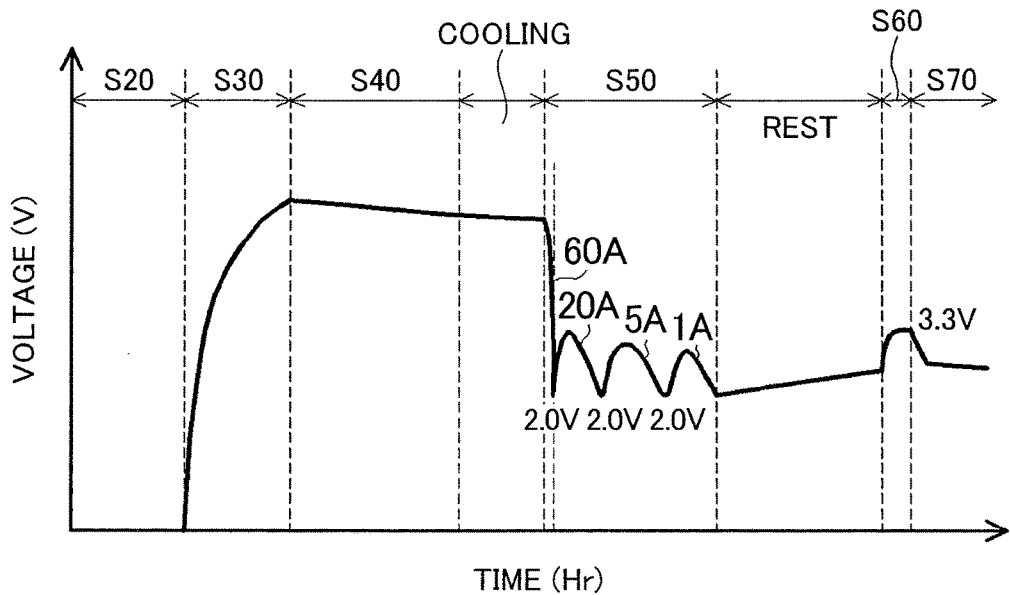
FIG. 2 is a graph showing the voltage variation of a battery assembly in a manufacturing method according to an embodiment.
Figure 3:
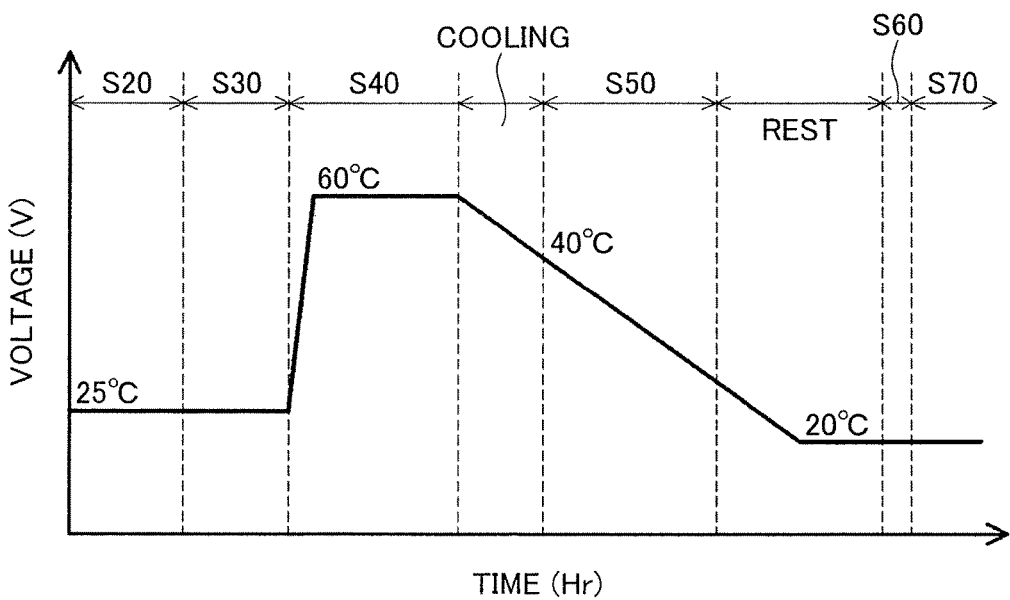
FIG. 3 is a graph showing the temperature variation of a battery assembly in a manufacturing method according to an embodiment.

The manufacturing method disclosed herein includes the following steps: (S10) electrode body preparation step; (S20) battery assembly constructing step; (S30) initially charging step; (S40) aging step; (S50) forcibly discharging step; (S60) SOC adjusting step; (S70) self-discharge inspection step; (S80) qualified product determination step. FIG. 1 shows a flow chart of the manufacturing method according to an embodiment. FIG. 2 shows the voltage variation of a battery assembly according to an embodiment. Moreover, FIG. 3 shows the temperature variation of a battery assembly according to an embodiment. Hereinafter, the steps will be described in sequence. Furthermore, in this Specification, a so-called "normal temperature region" refers to a temperature of 20° C.±10° C. (i.e., 10~30° C., typically 15~30° C., e.g., 20~25° C.).

In the electrode body preparation step (S10), an electrode body, which includes a positive electrode having a positive electrode active material layer and a negative electrode having a negative electrode active material layer, is prepared. Such an electrode body is made by typically stacking the positive electrode and the negative electrode so that the positive electrode and the negative electrode face to each other with a separator therebetween.

The positive electrode is typically formed by adhering a positive electrode active material layer containing a positive electrode active material to a positive electrode current collector. As the positive electrode current collector, a conductive member formed of a metal having good conductivity (such as aluminum, nickel, titanium, and the like) may be suitably used. As the positive electrode active material, one or more kinds of materials known to be used as the positive electrode active material of the non-aqueous secondary battery may be used. As preferable examples, layer-system and spinel-system lithium composite metal oxides (such as $LiNiO_2$, $LiCoO_2$, $LiFeO_2$, $LiMn_2O_4$, $LiNi_{0.33}Co_{0.33}Mn_{0.33}O_2$, $LiNi_{0.38}Co_{0.32}Mn_{0.30}O_2$, $LiNi_{0.5}Mn_{1.5}O_4$, $LiCrMnO_4$, $LiFePO_4$, etc.) may be used. Among these, from the point of view of thermal stability and energy density, lithium nickel cobalt manganese composite oxide containing Li, Ni, Co and Mn as constituent elements and having a layered structure (typically, a layered rock salt structure) may be preferably used. The positive electrode active material layer may contain, in addition to the positive electrode active material, one or more kinds of materials used as constituents of the positive electrode active material layer in a general non-aqueous secondary battery, as required. As examples of such materials, a conductive material and a binder can be used. As the conductive material, carbon materials such as various kinds of carbon blacks (acetylene black, Ketjen black, for example), activated carbon, graphite, carbon fiber and the like, can be preferably used. Moreover, as the binder, polymer materials such as polyvinylidene fluoride (PVdF) and polyethylene oxide (PEO) can be preferably used. In addition, various additives (for example, inorganic compound generating gas upon over-charging, dispersant, viscosity increaser, and the like) may be further contained as long as the effect of the present invention is not significantly impaired.

The negative electrode is typically formed by adhering a negative electrode active material layer containing a negative electrode active material to a negative electrode current collector. As the negative electrode current collector, a conductive member formed of a metal having good conductivity (such as copper, nickel, titanium, and the like) may be suitably used. As the negative electrode active material, one or more kinds of materials known to be used as the negative electrode active material of the non-aqueous secondary battery may be used. Preferable examples include carbon materials such as graphite, hardly graphitizable carbon (hard carbon), easily graphitizable carbon (soft carbon), carbon nanotubes, and the like. Among these, amorphous coating graphite (the graphite in which the surface of graphite particles is coated with amorphous carbon) can be preferably used. In a preferable embodiment of the amorphous coating graphite, a BET specific surface area is 5 $m^2/g$ or less (2.5 $m^2/g$~5 $m^2/g$, for example). In addition, in another preferable embodiment, the coverage ratio (coating amount) of the amorphous carbon is below 5% (typically 3% or lower, e.g., 0.5%~3%). By setting as such a specification, excellent battery characteristics (input and output characteristics, for example) can be achieved in, for example, a low SOC region (a region in which SOC is 30% or lower, for example). The negative electrode active material layer may contain, in addition to the negative electrode active material, one or more kinds of materials that can be used as constituents of the negative electrode active material layer in the general non-aqueous secondary battery, as required. As examples of such materials, a binder can be used. As the binder, for example, polymer materials such as styrene butadiene rubber (SBR), polyvinylidene fluoride (PVdF), polytetrafluoroethylene (PTFE) and the like can be preferably used. In addition, various additives (for example, viscosity increaser, dispersant, conductive material, and the like) may be further contained as long as the effect of the present invention is not significantly impaired. As the viscosity increaser, carboxyl methylcellulose (CMC), methyl cellulose (MC) or the like can be preferably used.

In the invention disclosed herein, the surface area of the negative electrode active material layer is larger than that of the positive electrode active material layer. In other words, the negative electrode active material layer includes a portion facing the positive electrode active material layer (facing portion) and a portion not facing the positive electrode active material layer (non-facing portion). As described above, in the case of having such constructed electrode body, the period required for self-discharge inspection (typically, the voltage unstable period after the SOC adjusting) generally becomes longer. Therefore, the application of the present invention is effective.

Though not particularly limited, an initial capacity ratio of the positive and negative electrodes, i.e., the calculated ratio of an initial charge capacity ($C_N$) of the negative electrode to an initial charge capacity ($C_P$) of the positive electrode ($C_N/C_P$) can be set as 1.0~2.1, for example. By setting the capacity ratio in above range, high energy density and excellent cycle characteristic can be achieved.

As the separator, porous sheets, non-woven fabrics or the like that are the same as those that have been used in a general non-aqueous secondary battery can be used. Preferable examples include porous resin sheets made of resins such as polyethylene (PE), polypropylene (PP), polyester and the like. In addition, the separator may also be configured as a heat resistance separator including an organic porous layer and a porous heat resistance layer, wherein the organic porous layer is made of the porous sheets, non-woven fabrics, or the like, with the porous heat resistance layer held on one side or both sides (typically, one side) of the organic porous layer. The porous heat resistance layer may be a layer containing, for example, an inorganic material (an inorganic filler such as alumina particles and the like, for example) and a binder. Alternatively, the heat resistance layer may be a layer containing resin particles (e.g., particles of polyethylene, polypropylene, and the like) having insulation property. Furthermore, in the non-aqueous secondary battery (e.g., lithium polymer battery) using solid electrolyte or gel electrolyte, the non-aqueous electrolyte itself may also double as the separator.

In the battery assembly constructing step (S20), typically, the electrode body and a non-aqueous electrolyte are contained in a battery case in a normal temperature region to construct the battery assembly. As the battery case, a case made of lightweight metal material such as aluminum, steel, or the like may be suitably used. Furthermore, in this Specification, a so-called "battery assembly" refers to a whole battery assembly assembled by using the prepared electrode body and the non-aqueous electrolyte until the initial charging step, without particular limitation on the type and configuration of the battery. For example, the battery case may be one before or after the sealing.

The non-aqueous electrolyte typically is a liquid composition in which a support electrolyte is dissolved or dispersed in a non-aqueous solvent. Alternatively, the non-aqueous electrolyte may be a substance, which becomes solid one (typically, so-called gel) by adding a polymer therein. As the non-aqueous solvent, organic solvents such as various kinds of carbonates, ethers, esters, nitriles, sulfones, and lactones which are used in the non-aqueous electrolyte in the general non-aqueous secondary battery can be used without limitation. From the point of view of forming an excellent film on the surface of the negative electrode active material, carbonates can be preferably used. Specific examples of carbonates include ethylene carbonate (EC), propylene carbonate (PC), diethyl carbonate (DEC), dimethyl carbonate (DMC), ethyl methyl carbonate (EMC) and the like. As the support electrolyte, if it contains charge carriers (such as lithium ions, sodium ions, magnesium ions, and the like; if in a lithium ion secondary battery, then lithium ions), the same as that of the general non-aqueous secondary battery can be appropriately selected and adopted without limitation. For example, in the case that the charge carriers are lithium ions, the support electrolyte may be lithium salts such as $LiPF_6$, $LiBF_4$, $LiClO_4$, and the like. Among them, $LiPF_6$ can be preferably used. Further, it is preferable that the concentration of the support electrolyte with respect to the whole non-aqueous electrolyte is adjusted to 0.7 mol/L to 1.3 mol/L.

Furthermore, as used herein, the non-aqueous electrolyte may contain, in addition to the non-aqueous solvent and the support electrolyte, other components as required as long as the effect of the present invention is not significantly impaired. Any of such components can be used for one or more objects of, for example, improving storage stability of the battery (prevention of capacity decrease during storage), improving cycle characteristics, improving initial charge/discharge efficiency, improving input/output performance, increasing gas generating amount when overcharging, and the like. As an example, a film forming agent such as vinylene carbonate (VC), vinylene ethyl carbonate (VEC), lithium bis oxalato borate (LiBOB) and the like; and a gas generator such as cyclohexyl benzene (CHB) and biphenyl (BP) and the like, may be cited. Among these, from the point of view of forming excellent film (having a low resistance and a high durability) on the surface of the negative electrode active material, the film forming agent is preferably contained.

In the initial charging step (S30), typically in the normal temperature region, the constructed battery assembly is charged at least once (initial charge). Generally, an external power supply is connected across the positive electrode (positive electrode terminal) and the negative electrode (negative electrode terminal) of the battery assembly, and is charged to (typically, by constant-current charging) a prescribed voltage. Thereby, a potion of the non-aqueous electrolyte (for example, the non-aqueous solvent and/or the film forming agent) is reduced and decomposed at the negative electrode to form a film (SEI film) from the non-aqueous electrolyte on the surface of the negative electrode active material. Due to the film, the interface between the negative electrode active material and the non-aqueous electrolyte is stabilized, and therefore the decomposition of the non-aqueous electrolyte accompanying with the subsequent charging and discharging can be suppressed.

The arrival voltage across the positive and negative electrode terminals (typically, the maximum arrival voltage) while the initial charge is also dependent on the type of the used active material and the non-aqueous solvent and the like, and therefore is not particularly limited. The arrival voltage across the positive and negative electrode terminals can be set in a voltage range exhibited for example when the SOC of the battery assembly is within 65%~110% (typically 80%~110%, e.g., 80%~105%). For example, for a battery which reaches a full charge at 4.2 V, the voltage across the positive electrode and the negative electrode may be set in a range of about 3.8 V~4.3 V. In the embodiment shown in FIG. 2, the battery voltage (termination voltage) when the present step is finished (after the charging) is set as about 4.1 V.

In addition, there is no limitation on the charging manner, for example, the charge may be performed in a manner (of constant current charge so that the above voltage is reached (CC charge), or may be performed in a manner of constant current charge so that the above voltage is reached and then constant voltage charge (CCCV charge). The rate of the CC charge is not particularly limited, but if the rate is too low, the process efficiency (operation efficiency) is apt to be lowered. On the other hand, if the rate is too high, then the formed film will have insufficient density, or the positive electrode active material is degraded. Therefore, it can be set as about 0.1 C~5 C (e.g., 0.5 C~2 C). Thereby, a film with high density can be formed on the surface of the negative electrode active material within short time. Furthermore, the charging may be performed once, or may be for example repeatedly performed twice or more times with discharging therebetween. In addition, other operations (pressure loading and/or supersonic irradiation, for example) for facilitating the reduction and decomposition of the non-aqueous electrolyte can be suitably performed as long as the battery characteristics are not adversely affected.

In the aging step (S40), after the temperature of the initially charged battery assembly (typically, with the SOC being 65% or higher, e.g., 80% or higher) is raised to a high temperature region of about 60° C. or higher (e.g., 60±2° C.), the battery assembly is maintained (left to stand) in this high temperature region for a prescribed period. Thereby, the film formed on the surface of the negative electrode active material can be modified as high quality film (i.e., a film having a low resistance and is capable of sufficiently suppressing the reaction with the non-aqueous electrolyte). Moreover, even in the case that foreign substance made of metal (e.g., Fe power, Cu power) is invaded from outside (typically, the components of the manufacturing apparatus), the metal foreign substance can also be dissolved and diffused as metal ions (e.g., Fe ions, Cu ions), and minute internal short circuit inside the electrode body can be prevented from occurring. Further, the upper limit of the temperature during the aging, from the point of view of preventing high temperature degradation, can be set at e.g., 80° C. or lower (typically 75° C. or lower, preferably 70° C. or lower, more preferably 65° C. or lower). In the embodiment shown in FIG. 3, the temperature of the battery assembly is kept at 60° C. Furthermore, as a method for raising and keeping the temperature of the battery assembly, heating means such as temperature-controlled constant temperature bath, infrared ray heater, and the like can be used.

The period (time), during which the battery assembly is maintained in the high temperature region, is also dependent on the maintained temperature, the composition of the non-aqueous electrolyte, etc., and therefore is not particularly limited. While the battery assembly is maintained in the high temperature region, typically the total time since the beginning of the temperature rising is set as 5 hours or more (e.g., 5 hours to 48 hours, preferably 10 hours to 24 hours). In the embodiment shown in FIG. 2, the maintained time is set as about 20 hours. In a preferable embodiment, throughout the present step, the voltage across the terminals adjusted in the initial charging step or a voltage substantially equal thereto (e.g., around ±0.5 V) is maintained. For example, for a battery which reaches a full charge at 4.2 V, it is preferable that the voltage across the positive electrode and the negative electrode is maintained at a state of about 3.7 V to 4.3 V (about 4.1 V in the embodiment shown in FIG. 2) throughout the present step. To this end, a voltage maintaining method such as CCCV charging and the like can be used in the present step.

In the cooling step, during the period from the end of the aging step (S40) till the beginning of the subsequent step of forcibly discharging, the temperature of the battery assembly is lowered down to a temperature region of 35° C. or higher and 55° C. or lower. For example, the temperature of the battery assembly inay be lowered down by using cooling means such as temperature-controlled constant temperature bath, water cooling, natural cooling and the like. As an example, in the case that the aging step (S40) is performed at e.g., about 50° C. to 60° C., sometimes it is possible to take relatively long time (e.g., 70 minutes or more) to make the temperature of the battery assembly lowered down to the normal temperature and stabilized. Therefore, after the end of the aging step (S40), the cooling shall be started as early as possible. Thereby, the temperature of the battery assembly can be stabilized in shorter time, and the operation efficiency can be improved. Furthermore, in the embodiment shown in FIG. 3, after the aging step (S40) is finished, the battery assembly is taken out from the temperature-controlled constant temperature bath, and is left to stand (naturally cooled) at room temperature (20° C.) for about 0.5 hours. Thereby, the temperature of the battery assembly can be lowered down from 60° C. during aging to about 40° C.

In a preferable embodiment, the time required for the present step (i.e., cooling time, specifically, the period from the end of the aging step till the beginning of the forcibly discharging step) is set as 48 hours or less (typically 24 hours or less, for example 20 hours or less, and preferably 10 hours or less, and more preferably 5 hours or less). By setting the time required by the cooling step within the above time, it is possible to make the period of high voltage state become required minimum, and it is possible to suppress the charge carriers excessively moving to the non-facing portion of the negative electrode active material layer. Therefore, the voltage unstable period in the subsequent self-discharge inspection step can be further shortened, and the inspection can be efficiently performed with short standby time. In addition, the lower limit may be set as, for example, 3 hours or more (typically 5 hours or more). Thereby the measurement error and deviation while the self-discharge inspection can be suppressed to be smaller, and the inspection can be performed accurately. Therefore, the defective products (the battery assembly in which internal short circuit occurs) can be efficiently removed, and can be prevented from proceeding to the subsequent steps.

In the forcibly discharging step (S50), after the temperature of the battery assembly is lowered down to the temperature region of 35° C. or higher and 55° C. or lower, the battery assembly is forcibly discharged. Generally, an external power supply is connected between the positive electrode (positive electrode terminal) and the negative electrode (negative electrode terminal) of the battery assembly to discharge (typically constant current discharge) the battery assembly to a prescribed voltage.

For a battery which reaches a full charge at 4.2 V for example, the arrival voltage (termination voltage) across the positive electrode terminal and the negative electrode terminal may set the voltage across the positive and negative electrodes in a range of about 1.6 V~2.3 V (typically 1.6 V~2.2 V, e.g., 1.7 V~2.1 V). In the embodiment shown in FIG. 2, the battery voltage (termination voltage) after the end of the present step is set at about 2.0 V.

Figure 4:
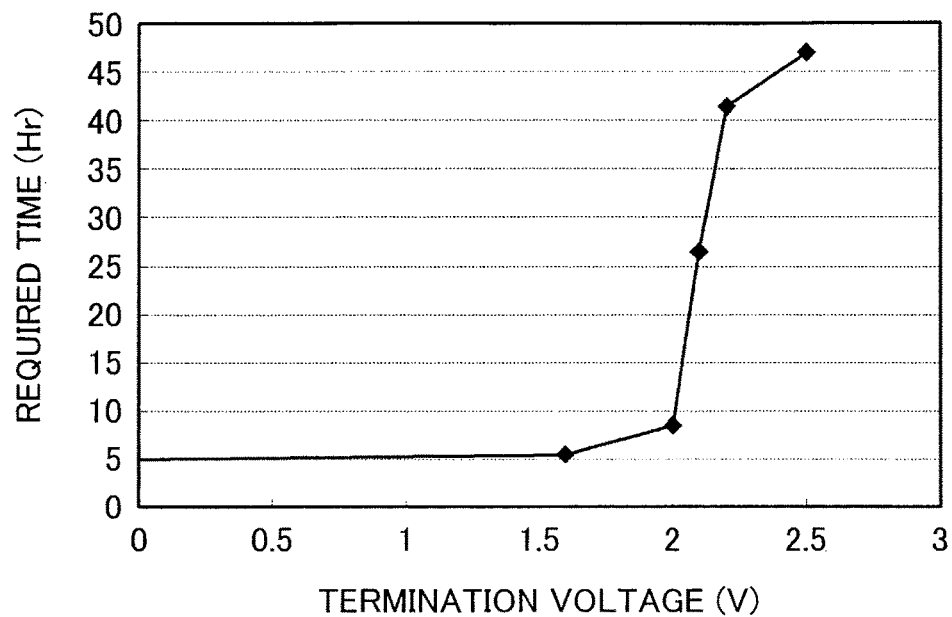
FIG. 4 is a graph showing the relationship between the termination voltage in the step of forcibly discharging and the time required from the end of the forcibly discharging to the beginning of the self-discharge inspection.

This situation will be described with reference to FIG. 4. FIG. 4 is a result of the investigated relationship between the termination voltage (V) in the present step and the time required from the end of the forcibly discharging till the beginning of the self-discharge inspection for a lithium ion secondary battery which is constructed by the present inventor and which reaches a full charge at 4.2 V. As explicitly shown in this figure, by setting the termination voltage in the present step in the above range, the step may be shortened without degrading the quality. That is, by setting the termination voltage at 2.3 V or lower (preferably 2.2 V or lower, more preferably 2.1 V or lower), which is greatly lower than that in the prior art, the potential difference between the facing portion and the non-facing portion in the negative electrode active material layer is increased. Thus, the charge carriers residual in the non-facing portion may be easily escaped, and the potential unevenness in the negative electrode active material layer can be suitably alleviated. Thereby, the manufacturing process can be further shortened, and the effect of the present invention can be achieved with a higher level. Furthermore, according to the study of the present inventor, in the case that the termination voltage is set at 2.5 V or higher, after forcibly discharging, the voltage is largely varied, and sometimes it takes a long time to stabilize the voltage. In this case, the time spent on manufacturing becomes almost equal to that in the prior art, and thus is not preferable. In addition, by setting the termination voltage at 1.6 V or higher (e.g., 1.7 V or higher), the degradation of the negative electrode active material due to too high potential of the negative electrode, or decomposition (reduction and decomposition) of the non-aqueous electrolyte, can be prevented.

There is no limitation on the discharge manner during the forcible discharge. For example, the forcible discharge may be performed in a manner of constant current discharge so that the above voltage is reached (CC discharge), or may be performed in a manner of constant current discharge so that the above voltage is reached and then constant voltage discharge (CCCV discharge). Moreover, the rate of the CC discharging is not particularly limited, but if the rate is too high, then the voltage will locally be reduced excessively, and sometimes the non-aqueous electrolyte may be electrochemically decomposed. Therefore, the rate may be set as 0.01 C to 5 C (for example, 0.05 C to 3 C). For example, in the battery assembly having a theoretical capacity of around 25 Ah, the current value can be set as about 0.5 A~75 A.

Furthermore, the discharge may be performed only once, or is repeatedly performed twice or more times at intervals. In that case, the discharging rates may all be the same, or may be different for each time. In a preferable embodiment, the discharging rate is maximal in the first discharge, and is gradually reduced down with the second discharge, the third discharge. In this way, the voltage of the battery assembly can be stabilized in further shortened time. Moreover, when the discharge is carried out twice or more times, the interval is varied according to the discharging rate, but may be set as, e.g., several tens of seconds to several tens of minutes (typically, several minutes). For example, in the embodiment shown in FIG. 2, the first discharge is performed at a constant current of 60 A (2.4 C), and the subsequent discharges since the second discharge are performed at interval of 5 minutes and at constant currents of 20 A (0.75 C), 5 A (0.2 C), 1 A (0.04 C), respectively, until reaching 2.0 V.

In a preferable embodiment, the battery assembly is cooled down while it is discharged. In other words, the time required for discharging is used to cool down the battery assembly. From the point of view of operability, as shown in FIG. 3, the temperature of the battery assembly may continue to be lowered since the above cooling step. In the embodiment shown herein, since the above standing period, the battery assembly continues to be maintained at room temperature (20° C.) (cooled down by naturally cooling). Thereby, the standby time required for stabilizing the temperature of the battery assembly in the subsequent steps can be greatly reduced (or eliminated), and the production efficiency can be extraordinarily improved.

In addition, in another preferable embodiment, during the present step, the temperature of the battery assembly is kept at 20° C. or higher and 55° C. or lower. Moreover, if being in this temperature region, the temperature may or may not be constant throughout the present step. By maintaining the battery assembly in the temperature region of 20° C. or higher and forcibly discharging it, the diffusion resistance in the negative electrode active material layer can be reduced. Thereby, the charge carriers can move smoothly, and the potential unevenness in the negative electrode active material layer can be more suitably alleviated. As a result, the voltage unstable period can be shortened. In addition, by setting the temperature of the battery assembly 55° C. or lower, the high temperature degradation can be suppressed. Moreover, the standby time required for stabilizing the temperature of the battery assembly in the subsequent steps can be eliminated (or reduced). Thereby the process time can be shortened without degrading the quality.

The rest time will be described. In a preferable embodiment, the rest time is provided in the period from the end of forcible discharge to the beginning of the subsequent SOC adjusting step. The battery after the forcible discharge is in a state in which the voltage is extremely low (in other words, the negative electrode is in an extremely high potential state). Therefore, by maintaining (leaving) the battery assembly as it is, the state that the potential difference between the facing portion and the non-facing portion is large can be maintained. As a result, such a large potential difference can be used as a driving-force to enable the charge carriers residual in the non facing portion to smoothly diffuse to the facing portion, and it is possible to suitably alleviate the potential unevenness in the negative electrode active material layer. This rest time generally is set as 0.5 hour or more (for example, 1 hour or more) and 24 hours or less (typically less than 24 hours, for example 20 hours or less, preferably 10 hours or less, more preferably 5 hours or less). In a preferable embodiment, the temperature, of the battery assembly is lowered to the normal temperature region in this rest time, and the lowered temperature makes the temperature of the battery assembly stable. Thereby, the deviation of the measured value in the self-discharge inspection can be reduced, and the inspection can be performed with high accuracy (stably).

In the SOC adjusting step (S60), the battery assembly after the forcible discharge is adjusted to a prescribed SOC. Generally, in a battery mounted on a vehicle such as a plug-in hybrid vehicle (PHV) and the like, high output density and durability will be required over a large range of the SOC region. However, generally, there is a tendency that the lower the SOC is (the less the battery capacity is), the lower the output density of the non-aqueous secondary battery is. Therefore, for the battery mounted on a vehicle (especially, PHV), the performance is likely to be a problem, especially in the low SOC region (e.g., a region where the SOC is 30% or lower). For such a battery requiring high output in the low SOC region (e.g., in the region where the SOC is 30% or lower), the SOC may be adjusted to 20% or lower (preferably 10% or lower, e.g., 1%~5%). Thereby, it is possible to exactly estimate the performance of the battery in the low SOC region. Moreover, according to the study of the present inventor, by adjusting to the low SOC state in the present step, the self-discharge inspection can be performed in a shorter time than that in the prior art.

In a preferable embodiment disclosed herein, after the forcibly discharging step, the battery assembly is adjusted to a prescribed SOC. Specifically, the SOC is adjusted so that the residual capacity ratio of the battery assembly represented by the equation, i.e., residual capacity ratio (%)=[($\Sigma$ charging capacity$-\Sigma$ discharging capacity)/$\Sigma$ charging capacity]×100, becomes 11.5% or higher and 14% or lower. Here, $\Sigma$ charging capacity represents the total charging capacity from the initial charging step (S30) to the SOC adjusting step (S60), $\Sigma$ discharging capacity represents the total discharging capacity from the initial charging step (S30) to the SOC adjusting step (S60). For example, in the embodiment shown in FIG. 2, if using $\Sigma$ charging capacity=(the charging capacity for once in the initial charging step (S30))+(the charging capacity for once in the SOC adjusting step (S60))=27.0 Ah; and $\Sigma$ discharging capacity=(the discharging capacity for four times in the forcibly discharging step (S50))=23.5 Ah, then the calculated residual capacity ratio=12.9%, and the SOC can be just adjusted so that this value is reached. By adjusting the residual capacity ratio to the above range, the self-discharge inspection period (specifically, the voltage unstable period) can be shortened as compared with the prior art. For example, according to the embodiment shown in FIG. 2, the voltage unstable period can be shortened from more than 7 days in the prior art to 2 days or less.

Figure 5:
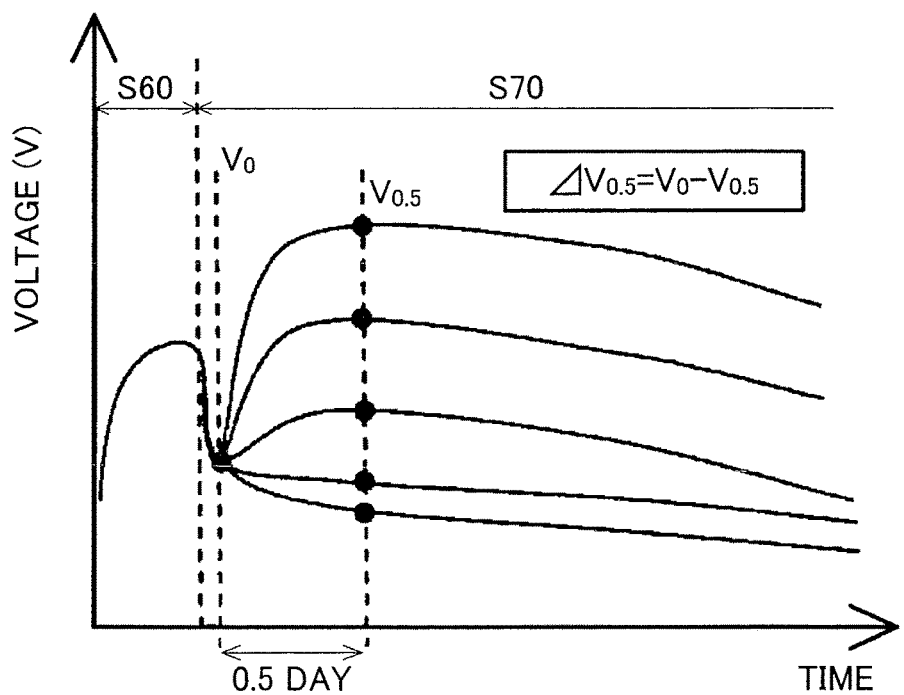
FIG. 5 is an illustrative diagram schematically showing the voltage variation during the self-discharge inspection.
Figure 6:
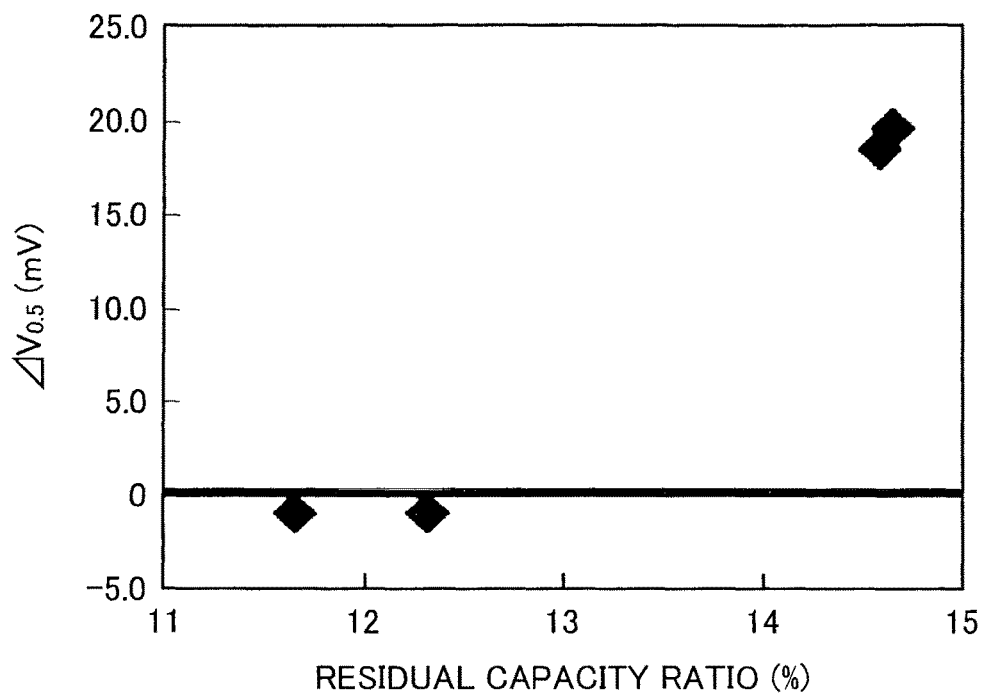
FIG. 6 is a graph showing the relationship between the residual capacity ratio and $\Delta V_{0.5}$ in the self-discharge inspection.

The relationship between the residual capacity ratio and the self-discharge inspection period (specifically, the voltage unstable period) will be described in detail with reference to FIG. 5 to FIG. 9. In order to shorten the voltage unstable period in the self-discharge inspection step (S70), the study of the present inventor focused on the following two points:

(1) suppressing the voltage rise itself during the self-discharge inspection; and (2) suppressing the voltage variation of the battery assembly. Firstly, point (1) will be described. FIG. 5 is an illustrative diagram for schematically showing the voltage variation in the self-discharge inspection step (S70). That is, after various study, the present inventor found that the behavior (pattern) of the voltage in the self-discharge inspection varies with the residual capacity ratio. Specifically, it was known that the voltage of the battery assembly after the SOC adjusting can be classified into a voltage which temporarily falls to $V_0$ due to over-voltage and then greatly rises and a voltage which does not greatly rise. Therefore, the present inventor has conceived of, as an index for controlling the residual capacity ratio, using a difference ($\Delta V_{0.5}$) obtained by subtracting, from a point ($V_0$, typically an inflection point) to which the voltage falls due to over-voltage, a potential ($V_{0.5}$) at the time after 0.5 day since $V_0$ is shown, as the index to suppress such a voltage rise. FIG. 6 is a graph showing the relationship between the residual capacity ratio and $\Delta V_{0.5}$ for a lithium ion secondary battery which is constructed by the present inventor and which reaches a full charge at 4.2 V. As shown in FIG. 6, by setting the residual capacity ratio before the self-discharge inspection at 14% or lower (e.g., below 14%, preferably 13.5% or lower, more preferably less than 13.5%), the voltage rise ($\Delta V_{0.5}$) in the self-discharge inspection step (S70) can be suppressed (for example, suppressed to 10 mV or lower, preferably 5 mV or lower, and more preferably 0 mV or lower). According to the study of the inventor, the voltage unstable period in the self-discharge inspection step (S70) can also be shortened from 2~ 3.5 days in the prior art to 0 day (the standby time being zero).

Figure 7:
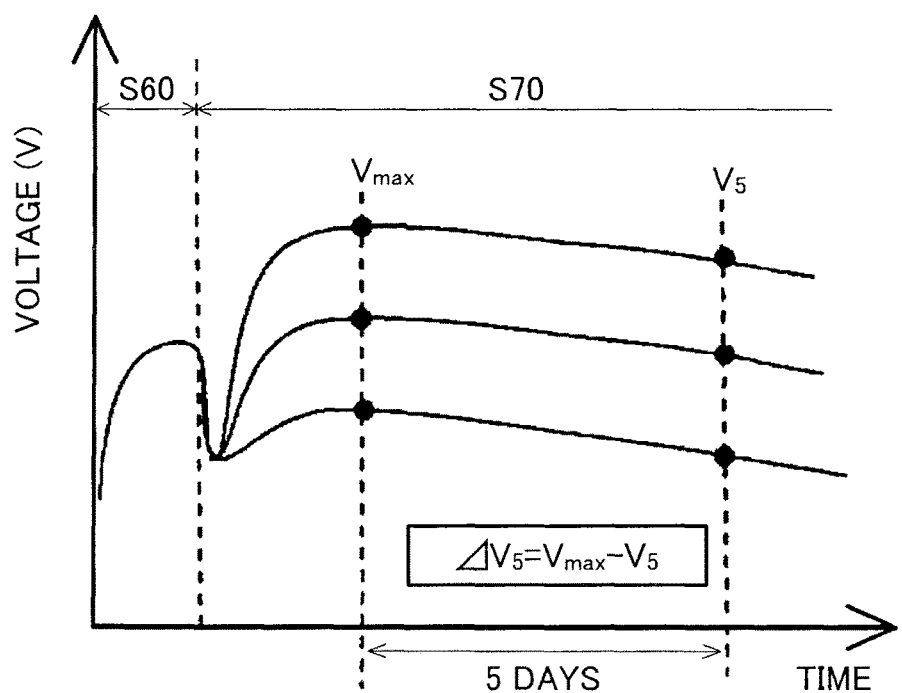
FIG. 7 is an illustrative diagram schematically showing the voltage variation in the case that the battery voltage rises in the early stage of the self-discharge inspection.
Figure 8:
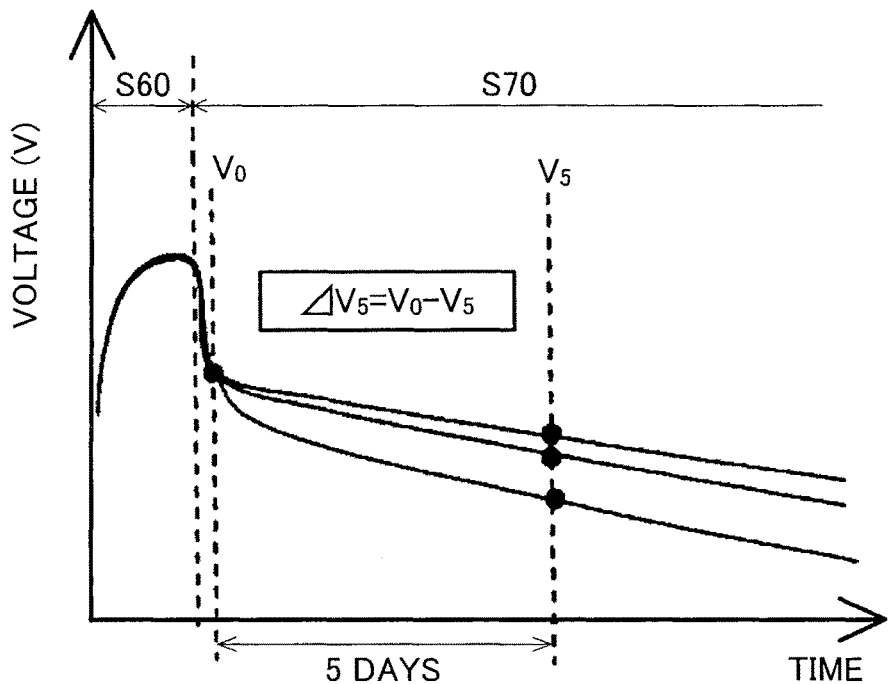
FIG. 8 is an illustrative diagram schematically showing the voltage variation in the case that the battery voltage falls in the early stage of the self-discharge inspection.
Figure 9:
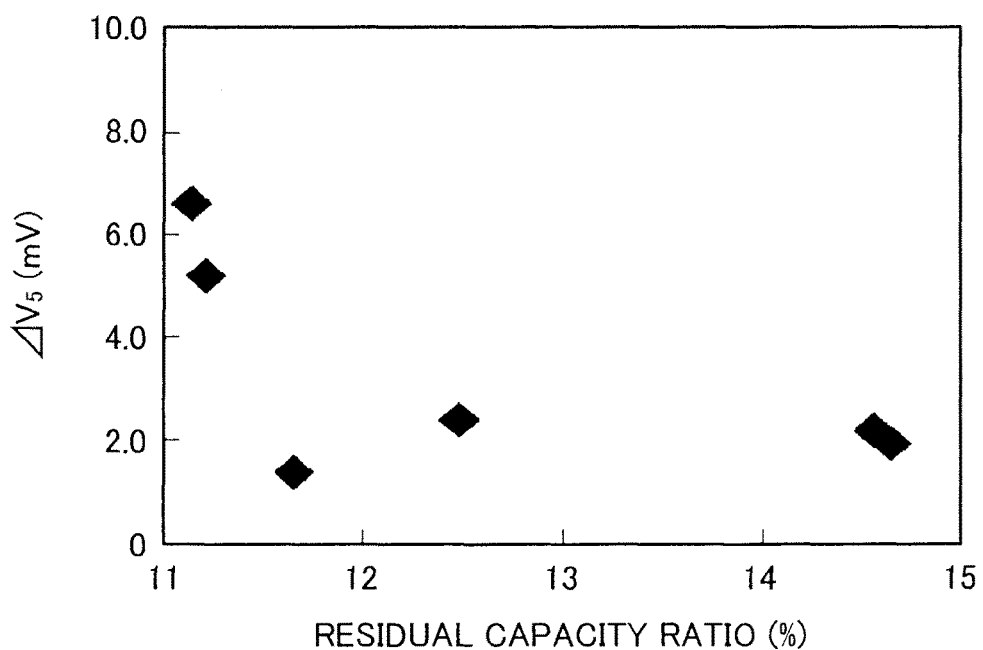
FIG. 9 is a graph showing the relationship between the residual capacity ratio and $\Delta V_5$ in the self-discharge inspection.

Next, point (2) will be described. FIG. 7 and FIG. 8 are diagrams showing the behavior in the self-discharge inspection step (S70) as shown in FIG. 5 in two different cases. FIG. 7 shows the case that the battery voltage rises in the early stage of the self-discharge inspection, and FIG. 8 shows the case that the battery voltage falls in the early stage of the self-discharge inspection. The present inventor has conceived of, as an index for suppressing the voltage variation, using the voltage variation during a prescribed five-day period in the self-discharge inspection step (S70) as the index. That is, in the case that the battery voltage rises in the early stage of the self-discharge inspection, as shown in FIG. 7, a difference ($\Delta V_5$) obtained by subtracting, from a maximum voltage ($V_{MAX}$), a potential ($V_5$) at the time after 5 days since the maximum voltage ($V_{MAX}$) is shown is used as the index. Likewise, as shown in FIG. 8, in the case that the battery voltage falls in the early stage of the self-discharge inspection, a difference ($\Delta V_5$) obtained by subtracting, from a point ($V_0$, typically an inflection point) to which the voltage falls due to over-voltage, a potential ($V_5$) at the time after 5 days since $V_0$ is shown is used as the index to suppress the voltage rise. Moreover, the present inventor has conceived of suppressing such a voltage variation to make $\Delta V_5$ smaller. FIG. 9 is a graph showing the relationship between the residual capacity ratio and $\Delta V_5$ investigated for a lithium ion secondary battery which is constructed by the inventor and which reaches a full charge at 4.2 V. As shown in FIG. 9, by setting the residual capacity ratio before the self-discharge inspection at 11.5% or higher (for example higher than 11.5%, preferably 12% or higher, more preferably higher than 12%), the voltage variation in the self-discharge inspection step (S70) can be suppressed to be smaller (for example, suppressed to be 4 mV or less). As stated above, in the present invention disclosed herein, by satisfying above points (1) and (2), the time spent on the self-discharge inspection step (S70) can be substantially shortened as compared with the prior art.

Furthermore, as represented by above equation, the residual capacity ratio can be adjusted by methods such as: adjusting the values of the arrival voltage and the charging current, charging time, number of charging times and the like in the initial charging step (S30); adjusting the standing period after the aging step; adjusting the values of the arrival voltage (termination voltage) and the discharging current, discharging time, number of discharging times in the forcibly discharging step (S50); adjusting the rest time after the forcibly discharging step; and adjusting the SOC in the SOC adjusting step (S60).

In the self-discharge inspection step (S70), typically the battery assembly which has been adjusted to the prescribed SOC is left to stand in a normal temperature region (e.g., 20° C. to 25° C.) and is discharged, and the voltage drop amount is measured. Thereby, it can be accurately estimated and grasped whether or not internal short circuit occurs due to some influences of the manufacturing condition. The temperature of the battery assembly in the discharge inspection is preferably, during this inspection, kept constant by using a constant temperature bath, for example. Thus the inspection can be performed accurately.

In qualified product determination step (S80), based on the result (voltage drop amount) obtained in the self-discharge inspection step, it is determined whether or not the battery assembly is qualified (whether internal short circuit exists). Specifically, at first a reference value for qualified product determination is set based on the measured results of voltage drop amount. There is no particular limitation on the method for setting the reference value, and for example, the arithmetic mean, the median or the like of the voltage drop amount of a plurality of battery assemblies may be used. Next, a difference between the reference value and the respective voltage drop amount of each battery assembly is calculated, and when the difference is no more than a prescribed threshold, the battery assembly is determined as "having no internal short circuit". On the other hand, when the difference exceeds the prescribed threshold, the battery assembly is determined as "having internal short circuit". As the threshold, it also depends on the specification of the battery as the object and the like and therefore is not particularly limited, but it can be set at a value equivalent to about $2\sigma\sim4\ \sigma$ ($\sigma$ means standard deviation). Then, by removing the battery assemblies which are determined as "having internal short circuit" based on the determination result, the defective products can be prevented from proceeding to the subsequent steps, and batteries with high reliability can be provided. As mentioned above, according to the technology disclosed herein, batteries with high reliability can be manufactured in even shorter time.

Although not intended to particularly limit, hereinafter, as a schematic configuration of a non-aqueous secondary battery according to one embodiment of the present invention, a non-aqueous secondary battery (unit battery) in which an electrode body rolled into a flat shape (rolled electrode body) and a non-aqueous electrolyte solution are contained in a flat rectangular parallelepiped (box-shaped) container (battery case) will be taken as an example to explain the present invention in detail. In the following drawings, like members and portions having the same function will be represented with the like numbers, and duplicated description will be omitted or simplified. A dimensional relationship (length, width, thickness and the like) in each of the drawings is not necessarily to reflect an actual dimensional relationship.

Figure 12:
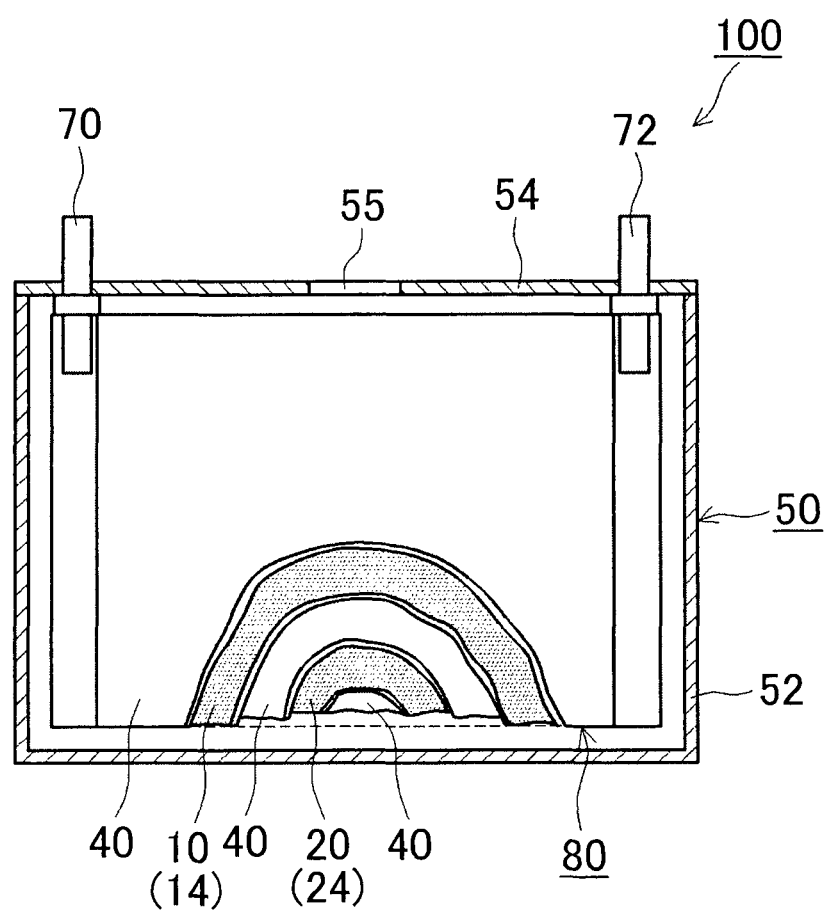
FIG. 12 is a sectional view showing the configuration of a non-aqueous secondary battery according to an embodiment.

FIG. 12 is a vertical section view schematically showing the sectional structure of a non-aqueous secondary battery 100. As shown in FIG. 12, the non-aqueous secondary battery 100 has the following structure: an electrode body 80 that is contained together with a non-aqueous electrolyte solution (not shown) in a flat box-shaped battery case 50. The electrode body 80 is an electrode body that a strip shaped positive electrode sheet 10 and a strip shaped negative electrode sheet 20 are flatly rolled with a strip shaped separator sheet 40 to form an electrode body (rolled electrode body).

The battery case 50 includes a battery case body 52 having a flat rectangular parallelepiped shape (box-shape) and an opened upper end, and a lid 54 for closing the opening. On the top of the battery case 50 (i.e., the lid 54), a positive electrode terminal 70 (for external connection) electrically connected to the positive electrode of the rolled electrode body 80 and a negative electrode terminal 72 electrically connected to the negative electrode of the rolled electrode body 80 are provided. On the lid 54, a safety valve 55 is provided, similar with the battery case in the conventional non-aqueous secondary battery, for discharging the gas generated inside the battery case 50 to the outside of the case 50.

Figure 13:
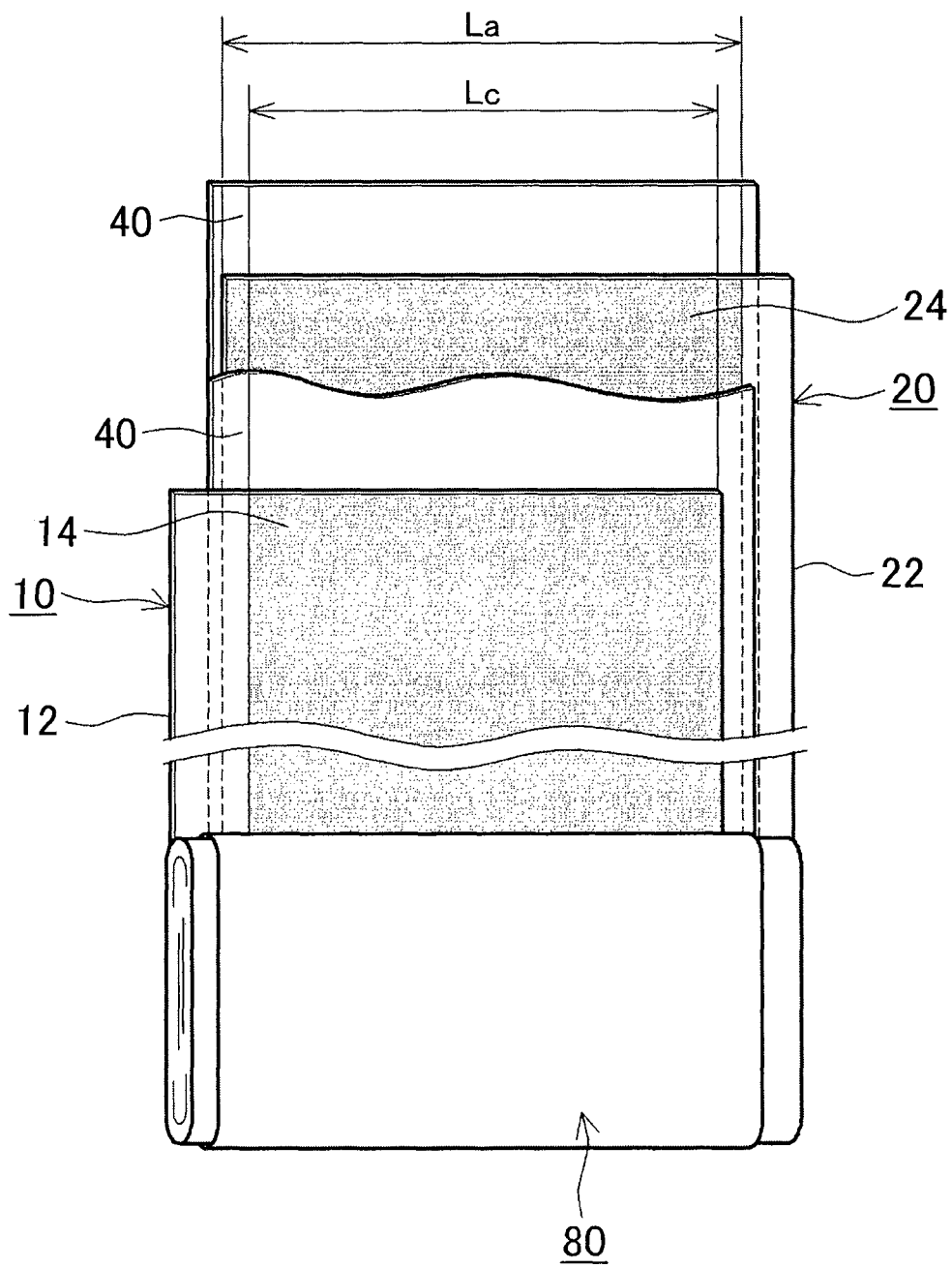
FIG. 13 is a schematic view showing a rolled electrode body in FIG. 12.

FIG. 13 is a schematic view showing the configuration of the rolled electrode body 80 shown in FIG. 12. As shown in FIG. 13, the rolled electrode body 80 according to the present embodiment having a strip sheeted positive electrode (positive electrode sheet) 10 and a strip sheeted negative electrode (negative electrode sheet) 20 in the pre-assembly stage. The positive electrode sheet 10 includes a strip shaped positive electrode current collector 12 and a positive electrode active material layer 14 formed on at least one surface (typically, both surfaces) of the positive electrode current collector 12 along a longitudinal direction. The negative electrode sheet 20 includes a strip shaped negative electrode current collector 22 and a negative electrode active material layer 24 formed on at least one surface (typically, both surfaces) of the negative electrode current collector 22 along the longitudinal direction. Furthermore, between the positive electrode active material layer 14 and the negative electrode active material layer 24, an insulation layer is provided for preventing the positive electrode active material layer 14 and the negative electrode active material layer 24 from directly contacting. Here, as the insulation layer, two strip sheeted separators 40 are used. Such a rolled electrode body 80 can be made by stacking the positive electrode sheet 10, the separator sheet 40, the negative electrode sheet 20, and the separator sheet 40 in this order to form a stack, rolling the stack in the longitudinal direction, and then pressing the obtained rolled body from a lateral direction to form a flat shape.

The direction from one end to another end in a rolling axis direction of the rolled electrode body 80 is defined as a width direction. In the central portion in the width direction, a rolled core is formed by overlapping the positive electrode active material layer 14 and the negative electrode active material layer 24 so that they are tightly stacked. The positive electrode active material layer 14 is formed on the surface of the positive electrode current collector 12. The negative electrode active material layer 24 is formed on the surface of the negative electrode current collector 22. Furthermore, at both ends in the rolling axis direction of the rolled electrode body, a positive electrode active material layer non-formed portion of the positive electrode sheet 10 and a negative electrode active material layer non-formed portion of the negative electrode sheet 20 each protrude outward from the rolled core. Moreover, a positive electrode current collecting plate and a negative electrode current collecting plate are attached to the positive electrode-side protruded portion and the negative electrode-side protruded portion respectively. The positive electrode current collecting plate and the negative electrode current collecting plate are respectively electrically connected to the positive electrode terminal 70 (FIG. 12) and the negative electrode terminal 72 (FIG. 12).

In the invention disclosed herein, the width La of the negative electrode active material layer 24 is configured (formed) to be larger than the width Lc of the positive electrode active material layer 14. Therefore, when the positive electrode sheet 10 and the negative electrode sheet 20 is overlapped, the negative electrode active material layer 24 includes an facing portion facing the positive electrode active material layer 14 and a non-facing portion not facing the positive electrode active material layer 14. By occluding the charge carriers in the non-facing portion, the metal precipitation on the negative electrode can be effectively suppressed. However, in the case that the width of the non-facing portion is too wide, irreversible capacity is increased and the cycling characteristic and storage characteristic may be degraded. Therefore, it is preferable that the difference between La and Lc is 20 mm or less (e.g., 10 mm or less), and it is particularly preferable that both ends of La protrude from Lc by about 1 mm~5 mm (e.g., 1 mm~3 mm), respectively. In other words, the difference in position of the ends between the positive electrode active material layer 14 and the negative electrode active material layer 24 is preferably set as 1 mm~5 mm (e.g., 1 mm~3 mm).

The non-aqueous secondary battery (typically, lithium ion secondary battery) disclosed herein can be used in various applications, and it is characterized by high battery performance (e.g., high energy density) and excellent reliability. For example, the initial capacity is high, and even in the low SOC region, excellent input/output density can be provided. Therefore, by taking advantages of such characteristics, the non-aqueous secondary battery can be used as, for example, a power source (driving power supply) for the motor mounted on vehicles. The vehicles is not particularly limited in terms of the type, but typically are automobiles, and specifically, plug-in hybrid vehicles (PHV), hybrid vehicles (HV), electric vehicles (EV) and the like can be mentioned. Therefore, in another aspect of the present invention, a vehicle equipped with any of the non-aqueous secondary batteries as disclosed herein can be provided.

Hereinafter, several examples according to the present invention will be described, but it is not intended to limit the present invention to these specific examples.

By mixing $Li_{1.00}Ni_{0.38}Co_{0.32}Mn_{0.30}O_2$ powder as the positive electrode active material powder, acetylene black (AB) and graphite (manufactured by TIMCAL Ltd. in the trade name of "KS4") as the conductive material, and polyvinylidene fluoride (PVdF) as the binder with N-methyl pyrrolidone (NMP) at a mass ratio of 91:3:3:3, a slurry composition was prepared. This composition was coated on a strip shaped aluminum foil (positive electrode current collector) having a thickness of about 15 μm to form a positive electrode active material layer. The obtained positive electrode was dried and pressed to form a sheet-like positive electrode (positive electrode sheet). Subsequently, by mixing amorphous coating graphite powder as the negative electrode active material, styrene butadiene rubber (SBR), and carboxymethyl cellulose (CMC) at a mass ratio of 98.3:1.0:0.7 with ion exchange water, a slurry composition was prepared. This composition was coated on a strip shaped copper foil (negative electrode current collector) having a thickness of about 10 μm to form a negative electrode active material layer. The obtained negative electrode was dried and pressed to form a sheet-like negative electrode (negative electrode sheet).

Next, the positive electrode sheet and the negative electrode sheet prepared as above were overlapped and rolled with a separator (here, a separator-having tri-layer structure in which a polyethylene (PE) layer was stacked with polypropylene (PP) layers on both sides was used) therebetween to form a rolled electrode body, and the obtained rolled electrode body was pressed from a lateral direction to thus form into flat shape. Then, by welding, a positive electrode terminal was bonded to the end of positive electrode current collector of the rolled electrode body, and a negative electrode terminal was bonded to the end of negative electrode current collector. The electrode body was contained in a battery case, and a non-aqueous electrolyte solution was poured into the case. Further, as the non-aqueous electrolyte solution, the following non-aqueous electrolyte solution was used: this non-aqueous electrolyte solution was obtained by dissolving $LiPF_6$ as the electrolyte in a concentration of 1 mol/L in a mixed solvent containing ethylene carbonate (EC), methyl ethyl carbonate (EMC) and dimethyl carbonate (DMC) at a volume ratio of 3:4:3, and adding vinylene carbonate at a ratio of 0.75 mass %, cyclohexyl benzene at a ratio of 4 mass %, and biphenyl at a ratio of 1 mass %, based on the whole non-aqueous electrolyte solution. Then, a lid was mounted on the opening of the battery case and was bonded by welding, thereby constructed a battery assembly (with a capacity ratio ($C_N/C_P$) of 1.36 and a rated capacity of 25 Ah).

Next, the above constructed battery assembly was held by a clamp, and was pressed and constrained so that the constraint pressure becomes 400 kgf. Next, the constrained battery assembly was charged at constant current of 20 A in constant current charge manner until the voltage across the positive electrode terminal and the negative electrode terminal reached 3.95 V, and was further charged at this voltage in constant voltage charge manner until the current becomes 0.1 A (initial charge). Next, the initially charged battery assembly was placed in a temperature controlled constant temperature bath, and was heated up to 60° C., and was subjected to aging at the environment temperature of 60° C. until elapsed time since the temperature rise became 20 hours. Subsequently, it took 0.5 hour to lower the temperature of the battery assembly down to 40° C. (cooling). Next, the battery assembly was discharged at constant current of 60 A in constant current discharge manner until the voltage across the positive electrode terminal and the negative electrode terminal reached 2.0 V, and the interval capacity and IV resistance were measured (forcible discharge). Next, the above battery assembly was left to stand (rest) for 1 hour. Next, after the battery assembly was adjusted to 3.3 V (in the state that the SOC is 3%), the battery assembly was left to stand for 5 days to have it self-discharged, and the voltage drop amount was calculated by subtracting the voltage value after the self-discharge from the voltage value before the self-discharge.

Using the above battery assembly, the time required from the end of the forcible discharge till the beginning of the self-discharge inspection and the residual capacity ratio were investigated by making at least one of the initial temperature of the forcibly discharging step (20° C., 30° C., 40° C., 50° C.) and the rest time after the forcibly discharging step (0 Hr~48 Hr) different. The results are shown in FIG. 10. As shown in FIG. 10, by adjusting the initial temperature of the forcibly discharging step and the rest time, the time required from the end of forcible discharge till the beginning of the self-discharge inspection and the residual capacity ratio, for example, can be controlled. Moreover, the dark black part in FIG. 10 indicates the residual capacity ratio is lower than 11.5% or higher than 14%. Further, the light black part indicates the data showing that the rest time becomes the shortest and the data showing that the rest time becomes the longest at the respective initial temperatures in the forcibly discharging step. FIG. 11 shows the relationship between the temperature of the battery assembly at the beginning of the forcibly discharging step and the rest time after the forcible discharge when the residual capacity ratio has been adjusted to be in the range of 11.5%~14% in the SOC adjusting step. As shown in FIG. 11, by adjusting the temperature of the battery assembly at the beginning of the forcibly discharging step and the rest time after the forcible discharge to be in the range in the black part, the battery can be reliably manufacture within shorter time as compared with the prior art. For example, in the case that the temperature of the battery assembly at the beginning of the forcibly discharging step is set at 50° C. and the rest time after the forcible discharge is set as 1.5 hours, the time required from the end of the forcible discharge till the beginning of the self-discharge inspection can be about 3.5 hours, and the voltage rise period in the self-discharge inspection can be 0 day (substantially eliminated). In the prior art method, the voltage rise period in the self-discharge inspection is about 2~3.5 days. Therefore, according to the method disclosed herein, the process can be significantly shortened, showing the technical significance of the present invention.

In the above, specific examples of the present invention are detailed, but these specific examples are only illustrations and are not intended to define the protection scope of the present invention. The technologies in the claims include those obtained by variously modifying and changing the specific examples illustrated above.

The invention claimed is:

1. A manufacturing method for a non-aqueous secondary battery, the manufacturing method comprising:
    (a) preparing an electrode body including a positive electrode having a positive electrode active material layer and a negative electrode having a negative electrode active material layer, a surface area of the negative electrode active material layer being larger than a surface area of the positive electrode active material layer, the negative electrode active material layer having a portion facing the positive electrode active material layer and a portion not facing the positive electrode active material layer;
    (b) constructing a battery assembly using the electrode body and a non-aqueous electrolyte;
    (c) initially charging the battery assembly;
    (d) aging the battery assembly at a temperature of 60° C. or higher;
    (e) after lowering the temperature of the battery assembly down to a temperature region of 35° C. or higher and 55° C. or lower, forcibly starting to discharge the battery assembly in the temperature region;
    (f) adjusting an SOC of the battery assembly;
    (g) measuring a voltage drop amount by self-discharging the battery assembly; and
    (h) determining whether or not the battery assembly is qualified based on the voltage drop amount.

2. The manufacturing method according to claim 1, wherein
    when the battery assembly is forcibly discharged, the temperature of the battery assembly is lowered down while the battery assembly is forcibly discharged.

3. The manufacturing method according to claim 1, wherein
    when the battery assembly is forcibly discharged, the battery assembly is discharged to 1.6 V or more and 2.3 V or less.

4. The manufacturing method according to claim 1, wherein
    while the battery assembly is forcibly discharged, the battery assembly is maintained in a temperature region of 20° C. or higher and 55° C. or lower.

5. The manufacturing method according to claim 1, wherein
    a period from an end of the forcibly discharging of the battery assembly until a beginning of the adjusting of the SOC of the battery assembly is set as 1 hour or more.

6. The manufacturing method according to claim 1, wherein
    when the SOC of the battery assembly is adjusted, the SOC is adjusted so that a residual capacity ratio of the battery assembly represented by the following equation (I) becomes 11.5% or higher and 14% or lower, $$\text{residual capacity ratio (\%)} = \frac{(\Sigma \text{ charge capacity} - \Sigma \text{ discharge capacity})}{\Sigma \text{ charge capacity}} \times 100. \quad (I)$$

7. The manufacturing method according to claim 1, wherein
    a period from an end of the aging of the battery assembly until forcibly staring to discharge the battery assembly is set as 24 hours or less.

8. The manufacturing method according to claim 1, wherein
    when the adjusting of the SOC of the battery assembly is finished, the SOC of the battery assembly is adjusted to 10% or lower.

9. The manufacturing method according to claim 1, wherein
    when the battery assembly is initially charged, the battery assembly is charged to a state in which the SOC is 65% or higher and 110% or lower, and the battery assembly is subjected to aging for at least 5 hours.

* * * * *